July 7, 1936.   W. C. COLEMAN   2,047,164
STORAGE BEVERAGE URN
Filed July 16, 1934
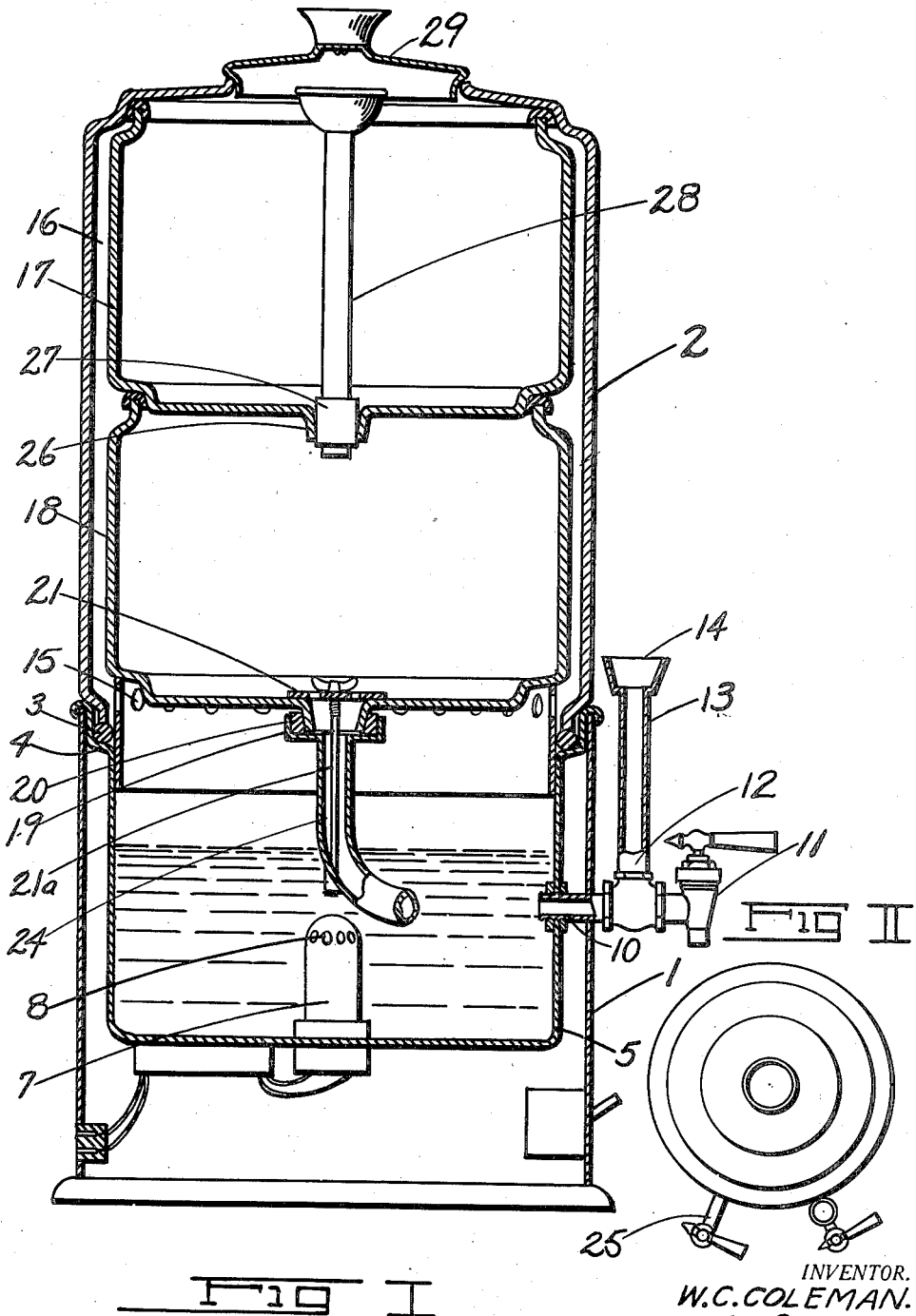
INVENTOR.
W.C. COLEMAN.
BY B. F. Funk
ATTORNEY.

Patented July 7, 1936

2,047,164

UNITED STATES PATENT OFFICE 2,047,164

STORAGE BEVERAGE URN

William C. Coleman, Wichita, Kans., assignor to The Coleman Lamp and Stove Company, Wichita, Kans., a corporation of Kansas Application July 16, 1934, Serial No. 735,357

3 Claims. (Cl. 53—3)

This invention relates to coffee storage and dispensing urns and is designed to provide multiple receptacles disposed one above the other, within a casing in which there is a lower chamber for the storing and dispensing of hot water suitable for mixing drinks and above this hot water chamber are multiple receptacles disposed one above the other for receiving, storing and dispensing coffee. This urn is not designed as a coffee maker nor as a water heater but only as a storage urn to receive hot water and hot coffee beverage and maintain same at suitable temperature for use.

Another object of the invention is to so construct the device that the operator cannot dispense coffee from the storage receptacle except by passing it through the lower dispensing receptacle thus insuring that all of the coffee from the lower dispensing receptacle must be used before the reserve supply in the upper storage receptacle is available.

The general construction of the urn selected for illustrative purposes has been described in an application filed by me on May 18th, 1934, Serial Number 726,209.

The primary objects of this invention are to provide a convenient and compact structure in which hot water and hot beverage coffee can be stored and from which it can be dispensed and especially to provide a second storage receptacle for a finished brew of fresh coffee to be held in reserve without mixing same with the older brew that is being dispensed. This reserve receptacle for coffee brew is disposed above the dispensing receptacle and is valved to deliver the brew into the dispensing receptacle when the dispensing receptacle becomes empty.

The disposition of this valved reserve receptacle above the dispensing receptacle is one important element in this invention. It is well known in the art that a coffee brew as it is discharged from a filtrating member tends to stratify in the storage receptacle which receives it. In using storage urns, prior to my invention, it was common practice to draw off measures of the heavy brew from the bottom and pour same back from above in order to mix the brew, thus equalizing the "body strength" in the mass. This "repouring" deteriorated the beverage by atmospheric exposure, loss of aroma and undue cooling. One object of my invention is to provide for automatic and effective "mixing" of coffee without deterioration of coffee brew. When the valve of the reserve receptacle is opened the brew contained therein is discharged with turbulence into the dispensing receptacle below. There is no exposure to outside air, no loss of aroma, nor cooling. It cannot be neglected or forgotten, the operator is compelled to open the valve and discharge the brew from the upper receptacle into the lower receptacle before it is available for use.

A further object of the invention is economy of structure and economy of space for crowded counters.

It is considered in the art bad practice to discharge freshly brewed coffee on an older brew. Chemical change has taken place in the older brew and a blending of the two quickly contaminates the whole mass. To serve coffee without interruption the usual practice to employ two storage urns involving additional expense and use of valuable space.

My invention provides a desirable and convenient means of storing and dispensing a coffee brew with no interruption in the service as coffee may be brewed and discharged into the reserve receptacle by any of the well known filtrating methods during the time period that coffee brew is being dispensed from the serving receptacle.

The novelty of the invention will be understood by reference to the following description in connection with the accompanying drawing in which:

Figure 1 is a vertical, longitudinal, sectional view through a coffee urn constructed in accordance with my invention, and Figure 2 is a reduced top plan view of the urn.

In the present embodiment of my invention the outer casing consists of a lower member 1 and an upper transparent member 2 which is supported on a ring gasket 3 on a circular seat 4 so that the upper member 2 may be easily removed. The seat is formed in the hot water receptacle 5 provided with a circumferential bead 6 resting on the upper edge of the metallic lower casing member 1. Within the receptacle 5 is a localized heater 7 which heats the water at a relatively high temperature so that it can be diffused through the main body of water through openings 8. A pipe 10 leads from the heating chamber to a faucet 11 outside the casing so that boiling water may be available for the purpose of making tea or other beverages. A combined water filler and tight gauge 12 is connected to the main water chamber with the gauge 13 proper outside the casing. The gauge has a funnel shaped inlet 14 by means of which water may be poured into the water heater chamber 5. The top of the receptacle 2 is open as at 15 to permit water vapor to pass up into space 16 between coffee beverage receptacles or containers 17 and 18 and the glass member of the outer receptacle.

This vapor is effective to insulate coffee receptacles from air surrounding outside casing. The amount of vapor delivered into the space determines the temperature of the receptacle. In the top of the water chamber 5 is a cup shaped member 19 to receive the constricted neck 20 of the lower beverage receptacle or container 18. The lower receptacle is held to the cup shaped member by a spider 21 and the bolt 21A which engages the pipe 24 leading to a faucet 25 so that the beverage can be dispatched. The upper glass coffee container 17 is rested upon the edge of the lower coffee receptacle and it is provided with an inverted neck 26 to receive a stopper or valve 27 having a stem 28 connected to the cover of the cap 29 by a releasable joint so that the covers can be used to lift stopper out of the neck or so the cover can be removed without disturbing the stopper. The apparatus is so constructed so that small quantities of coffee can be made from time to time so as to always have a fresh supply (it being understood that coffee beverage which "stands" too long becomes "flat" or losses its aromatic qualities.) Therefore, I have shown the devices arranged with two beverage or coffee receptacles so that when the beverage in one receptacle is about to be used a fresh batch of coffee can be introduced into the other receptacle and by alternately replenishing and emptying the beverage receptacles a substantially continuous flow of coffee can be provided without the necessity of making a dangerously large quantity.

It will be apparent that the water vapor will continuously circulate up around the beverage receptacles and that by providing a heating element in the water chamber to utilize a given wattage that there will be a controlled temperature in the space about the beverage receptacles, and when it is remembered that the beverage is introduced into the receptacles 17 and 18 after being made from an outside source it will be apparent that the beverage can be received and held at the correct temperature during the entire time it is in the urn.

That is to say that while the beverage is being dispensed from the receptacle 18 a fresh batch of coffee may be made and placed in receptacle 17 ready to be delivered into receptacle 18 when needed without loss of time. It will also be apparent that the prepared coffee from the upper receptacle cannot be delivered to a patron except from the lower receptacle, it being intended that the valve 27 is not to be unseated until the receptacle 18 is empty. The heater shown is merely illustrative of various types of heaters used.

What I claim is:

1. In a coffee storage urn, an exterior casing, having a water chamber, a pair of coffee storage receptacles within the casing above the water chamber and one above the other, the top receptacle having a storage space only and the one below it having a dispensing space, a heating element for the water in the chamber, a valved means exterior of the chamber to discharge water therefrom, the two coffee receptacles being spaced from the wall of the casing to provide a vapor space about the receptacles, a seal for the upper end of the space, a valved means to communicate the top receptacle with the one below it to gravitate prepared stored coffee beverage with turbulence thereinto, a dispensing faucet for the lower receptacle and means for introducing hot water into the water chamber in the casing.

2. A coffee urn to receive, store and dispense coffee after it has been made including a casing having a hot water chamber, means for heating the water in the chamber, a lower coffee beverage receptacle carried by the casing, an upper coffee beverage receptacle in superposed relation to the lower receptacle, having a single outlet communicating with the lower receptacle, the vertical walls of the receptacles being spaced from the wall of the casing to provide a space communicating with the water space to permit vapors from the water space to pass between the receptacles and the casing, a seal between the upper portion of the upper receptacle and the casing, a valve in the single outlet to permit communication between the upper receptacle and the lower receptacle only, whereby all the coffee from the upper receptacle will flow directly into the lower receptacle, and means exteriorly of the casing to withdraw beverage from the lower receptacle.

3. In a storage and dispensing urn for coffee beverage an exterior casing having a hot water container, a receptacle to receive beverage coffee for dispensing and a coffee storage receptacle adapted to receive a finished coffee beverage from above and to hold same in storage only; the container for hot water and the coffee beverage receptacles being disposed vertically one above the other, the hot water container being below the coffee receptacles and adapted to receive heated water from exterior of the casing and having a heating element adapted to maintain the water at a temperature near the boiling point; the receptacle for dispensing coffee being disposed above the hot water container in spaced relation with the casing and having a dispensing faucet exterior of the casing communicating with the bottom of the receptacle; the receptacle for storage coffee only being above the receptacle for dispensing coffee and in spaced relation with the casing and having a valve at its bottom to discharge with turbulence the stored coffee beverage into the receptacle below, the casing having sealed relation with the upper part of the top receptacle and the hot water container having communication with the space exterior of the coffee receptacles.

WILLIAM C. COLEMAN.